Dec. 2, 1952                  G. T. HART                2,619,661

CEMENT SOLE ATTACHING MACHINE USING HIGH-FREQUENCY

Filed Jan. 19, 1950                               9 Sheets—Sheet 1

Inventor
George T. Hart
By his Attorney

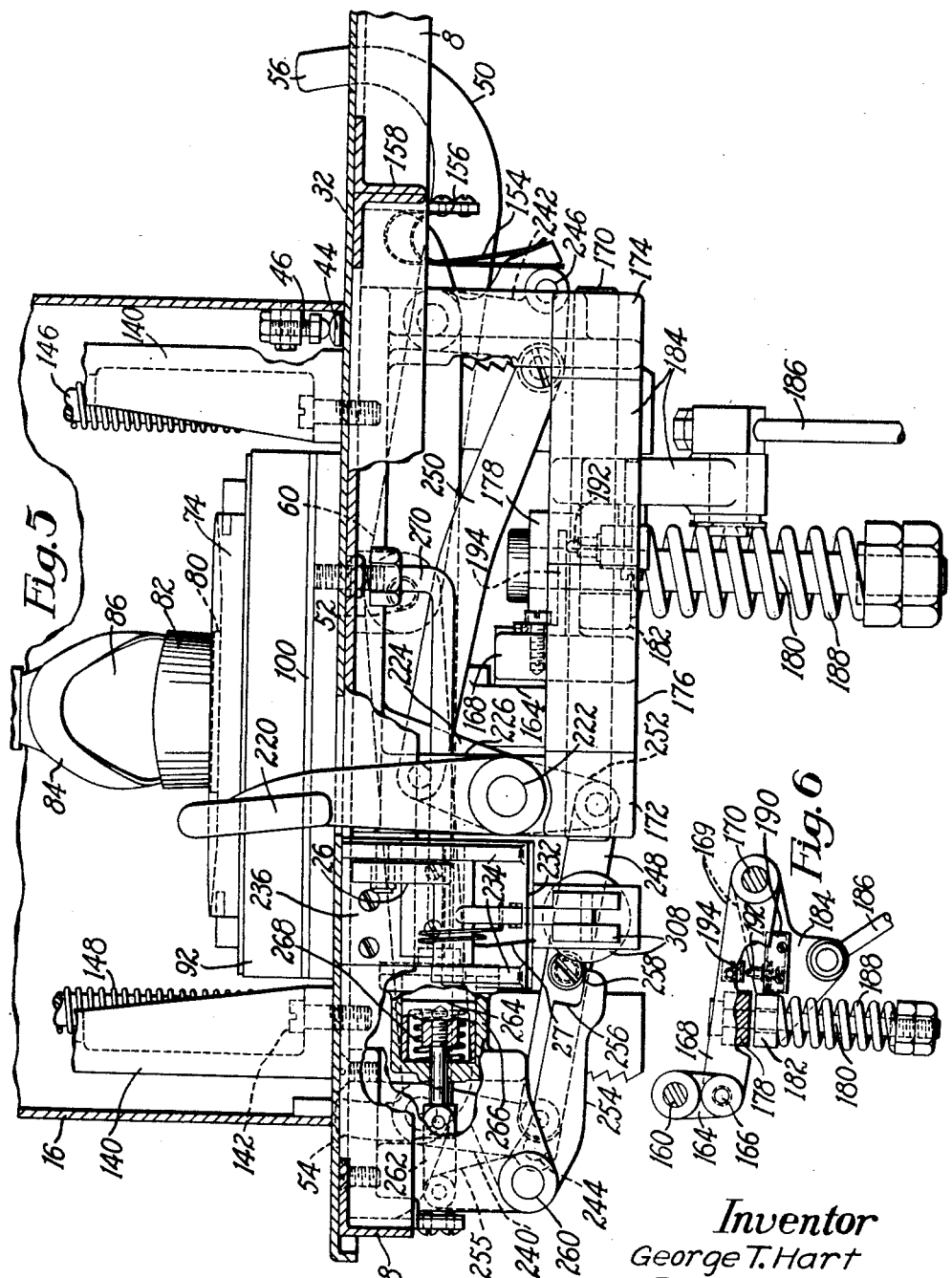

*Inventor*
George T. Hart
By his Attorney

Dec. 2, 1952 G. T. HART 2,619,661
CEMENT SOLE ATTACHING MACHINE USING HIGH-FREQUENCY
Filed Jan. 19, 1950 9 Sheets-Sheet 7

Fig.10

Inventor
George T. Hart
By his Attorney

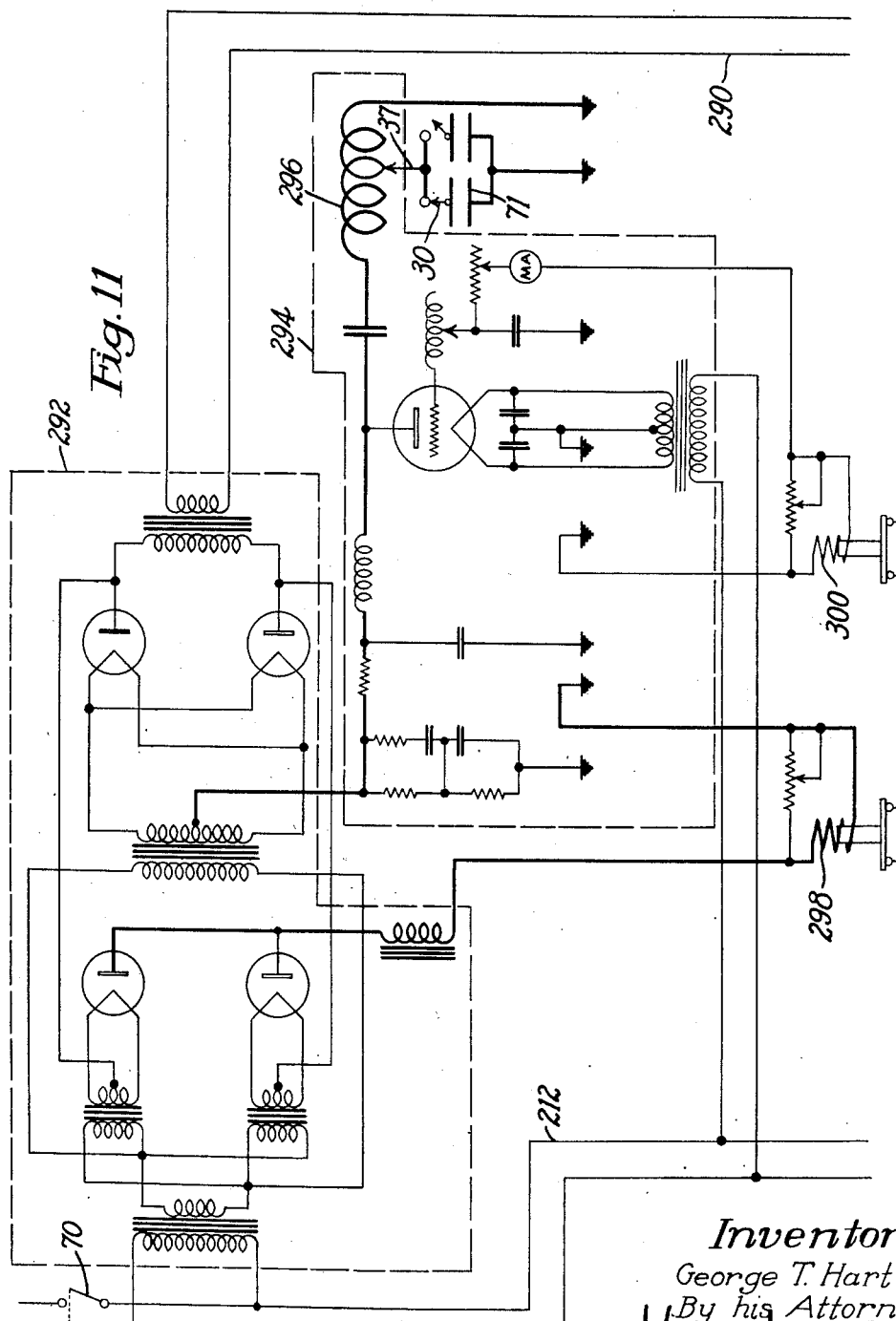

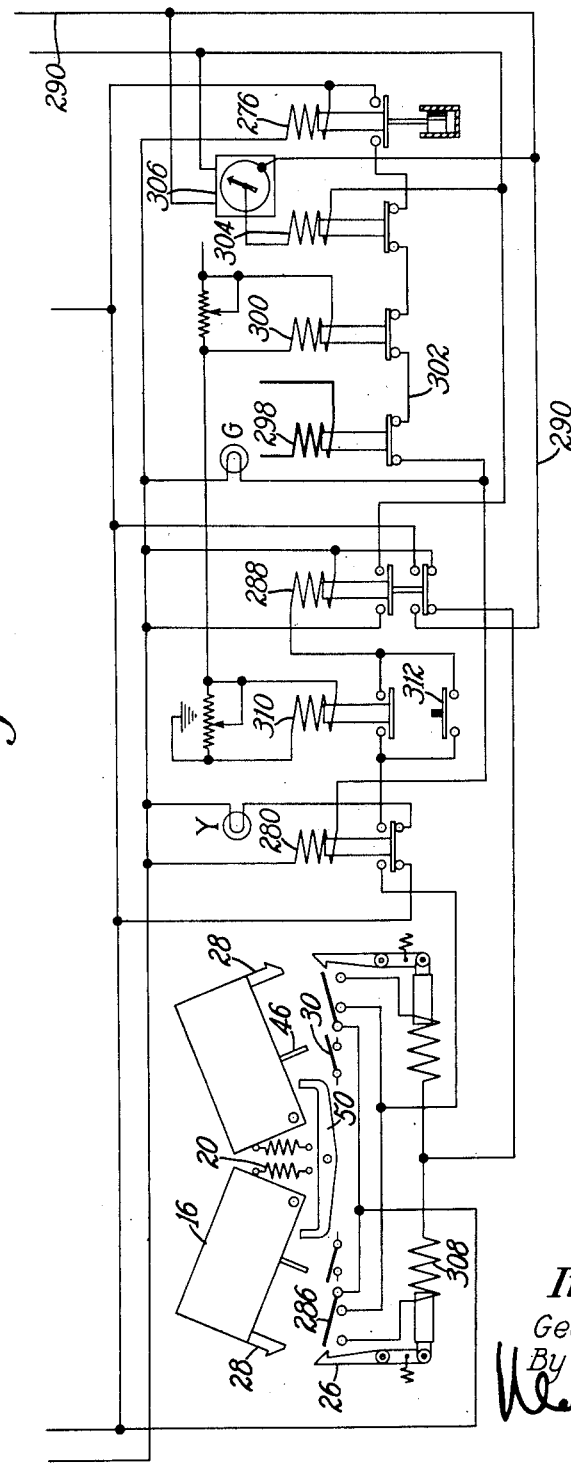

Patented Dec. 2, 1952

2,619,661

UNITED STATES PATENT OFFICE 2,619,661

CEMENT SOLE ATTACHING MACHINE USING HIGH-FREQUENCY

George T. Hart, Lynn, Mass., assignor to United Shoe Machinery Corporation, Flemington, N. J., a corporation of New Jersey Application January 19, 1950, Serial No. 139,420

15 Claims. (Cl. 12—33.2)

This invention relates to high-frequency treating apparatus, and is herein illustrated as embodied in a dual machine for attaching soles to shoes by means of an adhesive or cement which may be activated by a high-frequency field. Usually, and as illustrated, one of the two stations will be arranged for left shoes and the other will be fitted for right shoes.

In attaching soles to shoes by means of adhesive, it is customary to apply an adhesive to both the bottom of the shoe and the attaching face of the sole, then to activate the adhesive upon at least one of these parts, to clamp the parts together under pressure and to hold them in clamped position for a period sufficient to allow the adhesive to set. Such machines are usually made with a plurality of stations for the reason that the interval of time required for the setting of the adhesive is sufficient to permit an operator to prepare and clamp a number of shoes. Machines with eight and more stations are common.

One object of the invention is to provide an improved two-station apparatus, such as one for sole attaching, in which the activation of the adhesive is effected by means of a high-frequency electric field, and which will be safe to operate and convenient to use.

One important feature of such a machine relates to the use of movable shields, for covering the electrodes and the work at each station, which are interlocked so that only one station may be operated at any time, thus reducing the required size of the power supply and avoiding danger to the operator. In connection with this arrangement it is found desirable to employ one or more control switches, operated by the closing of the shield, and an electrically operated latch for holding the shield in closed position until the expiration of a predetermined interval when the latch is released and the power shut off, under the control of a timing apparatus.

Another feature of the invention especially applicable to the utilization of such a machine for attaching soles to shoes resides in a treadle-operated mechanism for clamping the work upon an inflatable pad and for dilating the pad only after sufficient pressure has been mechanically applied so that the pad will not be over expanded. Associated with this arrangement are safety devices preventing the release of the clamping device before the pad has been deflated. A hand lever for deflating the pad is rendered inoperative on the closing of the cover and a parallel linkage keeps the lower surfaces of the work-contacting blocks parallel.

This is a continuation in part of my application Serial No. 85,618, filed April 5, 1949, now abandoned.

These are other features of the invention will best be understood from a consideration of the following specification taken in connection with the accompanying drawings in which Fig. 1 is a front elevation of a two-station machine embodying the present invention, with one shield closed;

Fig. 5 is an elevation of the parts of the clamping mechanism which lie beneath the top of the machine, viewed as if the top were horizontal;

Fig. 6 is a side elevation, on a smaller scale, of the two-part treadle lever;

Figs 10 and 11 are electrical diagrams showing the association of some of the electrical switches with the operating parts of the machine; and Fig. 12 is an electrical diagram of a modification of the circuits illustrated in Figs. 10 and 11.

Figure 1:
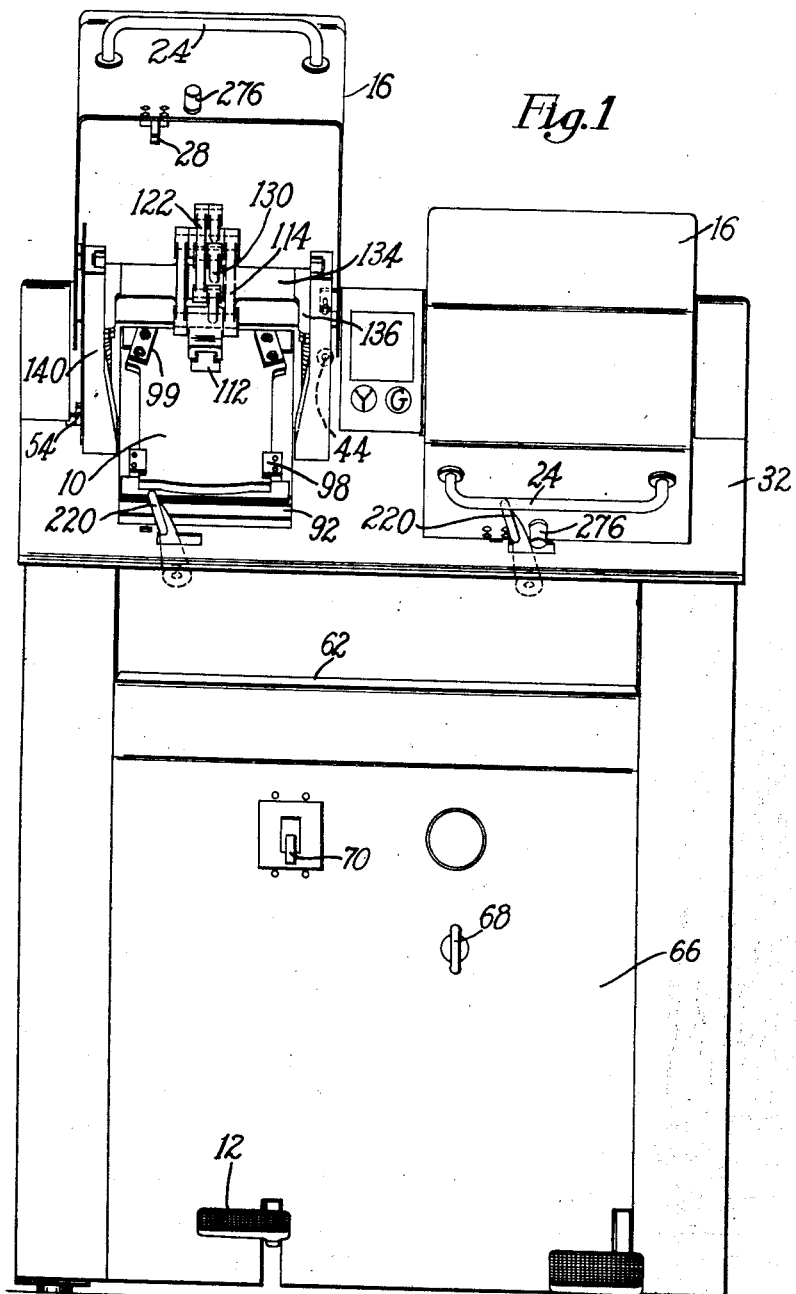

As may be seen from Fig. 1, the invention is embodied in a twin or two-station machine, having an angle-iron frame 8 (Fig. 2) which is covered by steel plates, the machine being provided with electrode pads 10 one of which is suitable for left shoes and the other for right shoes. Associated with each pad is a clamping mechanism, designed to be operated by a foot treadle 12, and a protecting cover-like electrical shield 16 hingedly mounted at 18 at the rear of the pads. Each of these shields is provided with an opening spring 20 and a buffer 22 to soften the action of the spring when the shield flies open. The shields are arranged to be closed by handles 24 and are held in closed position by latches, such as that shown at 26 in Fig. 9, which are urged by springs 27 to cooperate with notched pins 28 carried by the front of the shield.

To expedite the operation, the machine is arranged so that one sole is being attached while another shoe is being positioned and clamped at the other station. This enables the use of an oscillator only large enough for the treatment of one shoe at a time and to that end two protective devices are employed.

Figure 8:
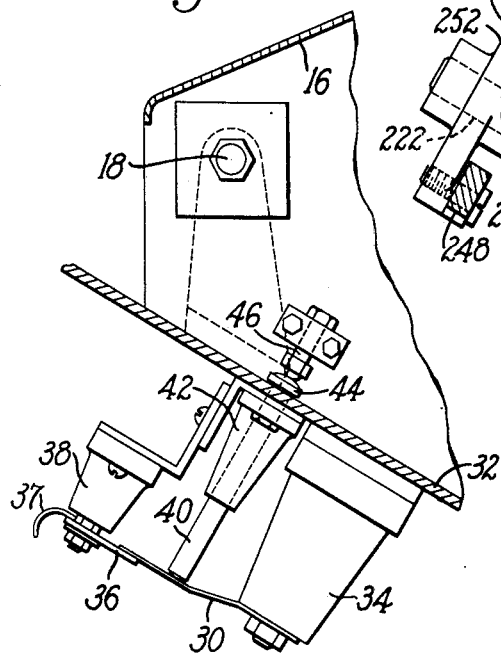
Fig. 8 is a detail in vertical section showing a switch operated by the closing of the shield and connected between an oscillator and the electrodes at that station.

One of these comprises a resilient blade of a switch 30 (Fig. 8) supported beneath a cover plate 32 of the machine on an insulator 34 and adapted to be depressed into contact with a fixed plate 36 mounted on suitable supports including an insulator 38 and connected by a lead 37 to a tank coil (Fig. 11) in an oscillator 204. This blade of the switch 30 is flexed down to close its circuit by means of a plunger 40 which is slidably mounted in a guide 42 and which has a head 44 above the top plate 32 in position to be engaged by a stud 46 carried by the side of the corresponding shield 16. This switch is inserted between the high-frequency power supply and the electrode so that an electrode can only be energized when its shield is closed. Another protective device is mechanical and comprises a sort of whiffletree lever 50 (Fig. 5) pivoted on a stud 52 beneath the top plate 32. This lever 50 has upstanding ends 54 and 56 which are alined with the side pieces of the respective shields (see also Fig. 1) so that when one shield is closed the other end of the lever projects above the top plate and prevents the closing of the other shield. The pivot stud 52 (Fig. 3) is threaded in one side 58 of a channel formed in inverted position in the under side of a casting 60 which is attached to the under face of the top plate 32.

For the convenience of the operator the top plate 32 and the apparatus supported by it are inclined downwardly toward the operator. This top plate is carried by the frame 8 and at the front a shelf 62 (Fig. 2) is provided for temporarily supporting the work. A portion of this shelf lies in a recess 64. Below the shelf is a front plate 66 (Fig. 1) supporting an air pressure control handle 68 and a toggle switch 70 controlling the supply of power to the apparatus as a whole.

Figure 7:
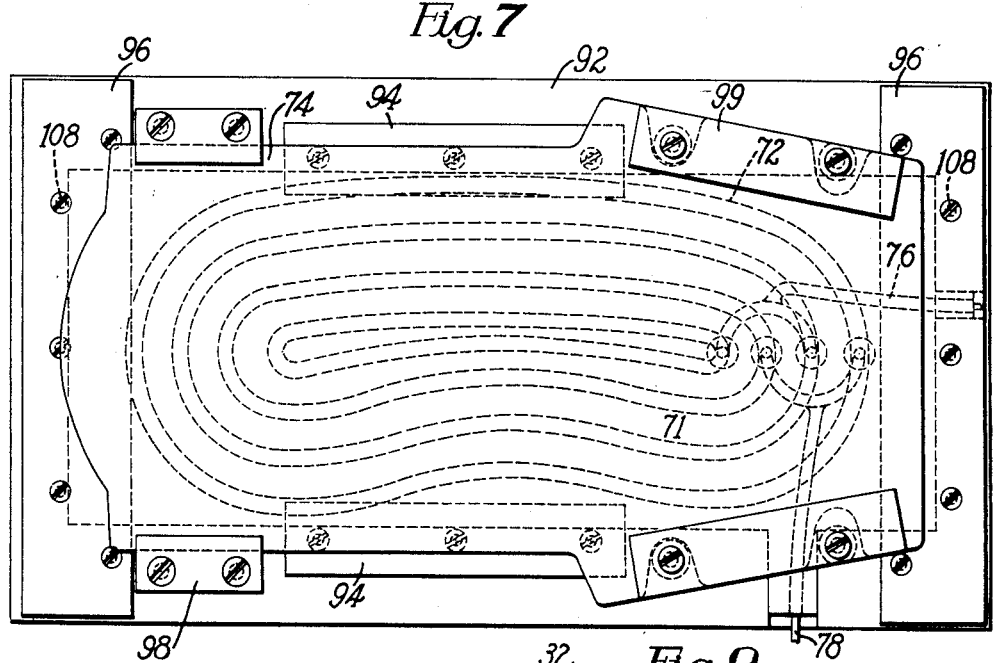
Fig. 7 is a plan view of the electrode pad and its support.

The activation of the cement used to attach the sole to the shoe may be effected by means of any desired type of high-frequency electrode 71, one type illustrated in Fig. 7 being of the sort shown and described in Letters Patent of the United States No. 2,412,932, granted December 24, 1946, upon my application. This electrode 71 comprises a series of loops 72 which are embedded in a rubber pad 74 and are alternately connected to lead-in wires 76 and 78, thus providing a series of stray fields extending above the pad which intersect a sole 80 and the cement above it so that it may be attached to the shoe which in the illustrated form includes a platform sole 82 and an upper 84 mounted upon a last 86.

The electrode pad rests upon a cushion 90 within a rigid frame 92 (Fig. 4) of dielectric material and the cushion is held in the frame by means of clamp plates 94 and 96 (Fig. 7). The pad is held in position above it by U-shaped clamps 99 and overhanging clamps 88. Below the cushion 90 is a diaphragm 100 (Fig. 4) which is clamped tightly by the frame 92 against a metal plate 102 having a shallow central recess 104 connected to a source of compressed air by means of a pipe 106. The frame, diaphragm, and plate are clamped to the top plate 32 of the frame by means of screws such as those shown at 108 (Fig. 7).

Figure 3:
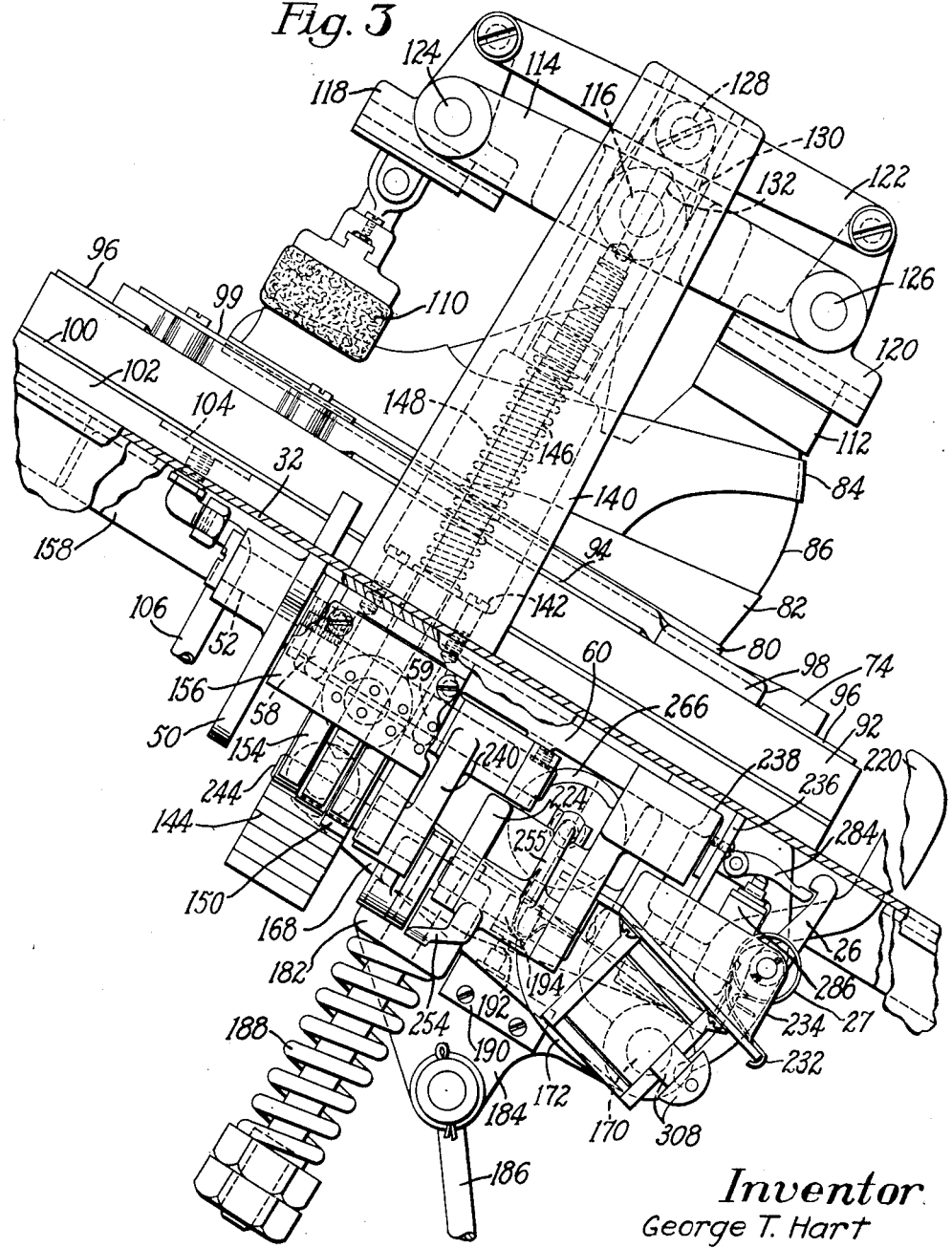
Fig. 3 is a view in side elevation of the shoe clamping and supporting mechanism with the clamping pressure applied.
Figure 4:
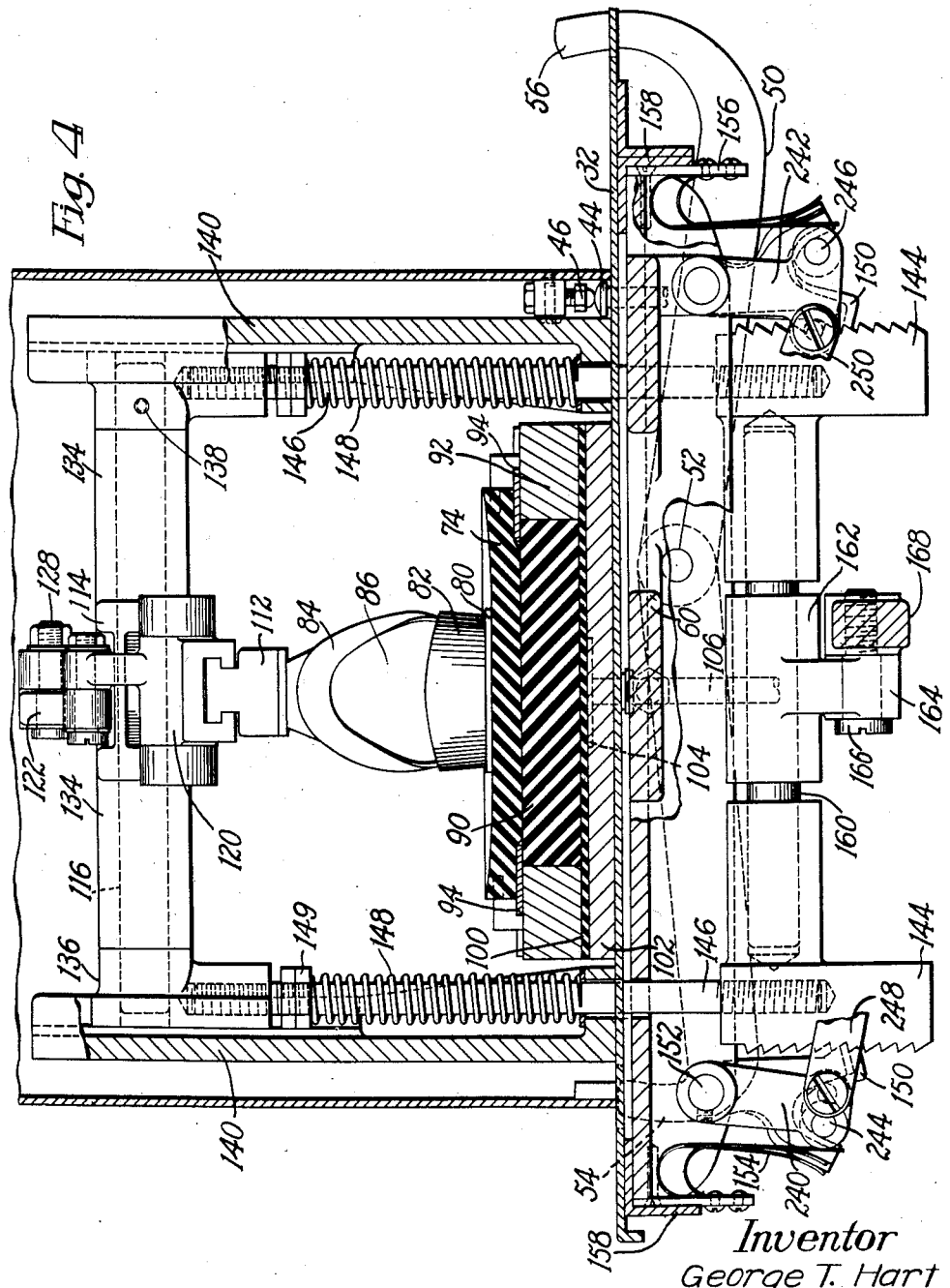
Fig. 4 is a section taken normal to the shoe support and with some parts shown in elevation.

A mechanism for clamping the shoe firmly down upon its supporting pads is best shown in Figs. 3 and 4 and comprises a toe block 110 resting on the toe and a heel block 112 resting against the cone of the last, and also includes connecting parallel links for maintaining these members with their work contacting surfaces always in planes substantially parallel to the surface of the pad. The parallel links comprise an H-shaped lower carrier arm 114 loosely pivoted upon a cross bar 116. The toe block and heel block are slidably mounted for adjustment in the under sides of holders 118 and 120 having upstanding arms connected by a top link 122.

These holders are mounted on pivot rods 124 and 126 extending between the sides of the H-shaped member and their upper ends are joined by the upper link 122 which is fulcrumed by a pivot pin 128 on an upright arm 130 secured by means of a taper pin 132 to the rod 116. This rod passes through spacer sleeves 134 which, for convenience, are integral with the H-shaped link 114 and its ends are positioned in slides 136. One end of the rod 116 is fastened by a setscrew 138 so that it may not rotate in the slides. These slides 136 are received in grooved ways in uprights 140 which are fastened to the top plate 32 by means of screws 142 (Fig. 3) long enough to extend through that plate and threaded into the casting 60 just beneath it which supports some of the apparatus positioned there.

The slides 136 are connected to ratchet blocks 144 by means of rods 146 the ends of which are reversely threaded in the members which they connect. Springs 148 to lift the clamping apparatus are coiled upon the rods 146 and interposed between the bases of the uprights 140 and tension adjusting nuts 149 threaded on the rods. Associated with the ratchet blocks 144 are pawls 150, there being three at each side which are hung upon pivots 152 extending between one side 58 of the channel-like member underneath the top plate and the opposite side 59 thereof. The three pawls are of different lengths to secure different levels of engagement with the teeth of the ratchet so that the effect is the same as if the ratchet teeth were much finer. These pawls are held against the ratchet blocks by leaf springs 154 which are bent in a semicircle and then secured to a depending plate 156 fastened on the downwardly extending flanges 158 of the angle iron frame 8.

In order to pull down the clamps with substantial force the ratchet blocks 144 are connected to a foot treadle 12. This connection involves a cross rod 160 (Fig. 4) between the ratchet blocks and on this rod there is mounted a sleeve 162 having a depending arm 164. This arm is joined by a stud 166 to one end of a lever 168 comprising the upper half of a two-part treadle lever 169 (Figs. 5 and 6). The other end of this upper half 168 is fulcrumed upon a cross rod 170 carried by depending hangers 172 and 174 (Figs. 5 and 9) which are integral with the casting 60. The hanger 172 is hook shaped, while the other hanger 174 is more nearly straight. The near end of this lever 168 is shown in Fig. 5 and comprises a sleeve-like portion 176 around the rod 170. Between its ends, it has an outwardly extending flange 178 (see also Fig. 6) with which there is associated a headed bolt 180 passing through that flange and also through another flange 182 upon the lower half 184 of the treadle lever 169. This lower lever 184 is pivoted upon the other half of the rod 170 and is connected by a treadle rod 186 to the treadle 12. A rather heavy spring 188 surrounds the bolt 180 and is loaded to hold the flanges 178 and 182 normally in engagement.

When the treadle 12 is depressed the two parts 168 and 184 of the treadle lever 169 will be swung as a unit about the pivot rod 170 to pull downward the hollow square comprising the lower cross rod 160, the ratchet blocks 144, the upright rods 146 and the slides 136 connected by the upper cross rod 116, compressing the springs 148. This will bring the clamp blocks 110 and 112 firmly against the shoe and its last and the clamp will be held against return motion by the pawls 150. When the resistance to downward movement exceeds the loading of the spring 188, the two parts of the lever will separate and in so doing will operate a switch 190 (Figs. 3 and 6) which is attached to the lower part 184 of the treadle lever. The spring expelled button 192 in this switch, which is normally held down by engagement with a flange 194 secured to the upper half 168 of the treadle lever, will move upwardly and close the switch to permit operation of an air valve 200 as will later be explained. Beneath the foot treadle 12 is a stop 201 (Fig. 2) and, if no shoe is in position on the pad, the movement of the treadle will not be great enough to bring the clamping blocks 110, 112 against the pad and the switch 190 cannot be operated, thus protecting the pad.

Figure 2:
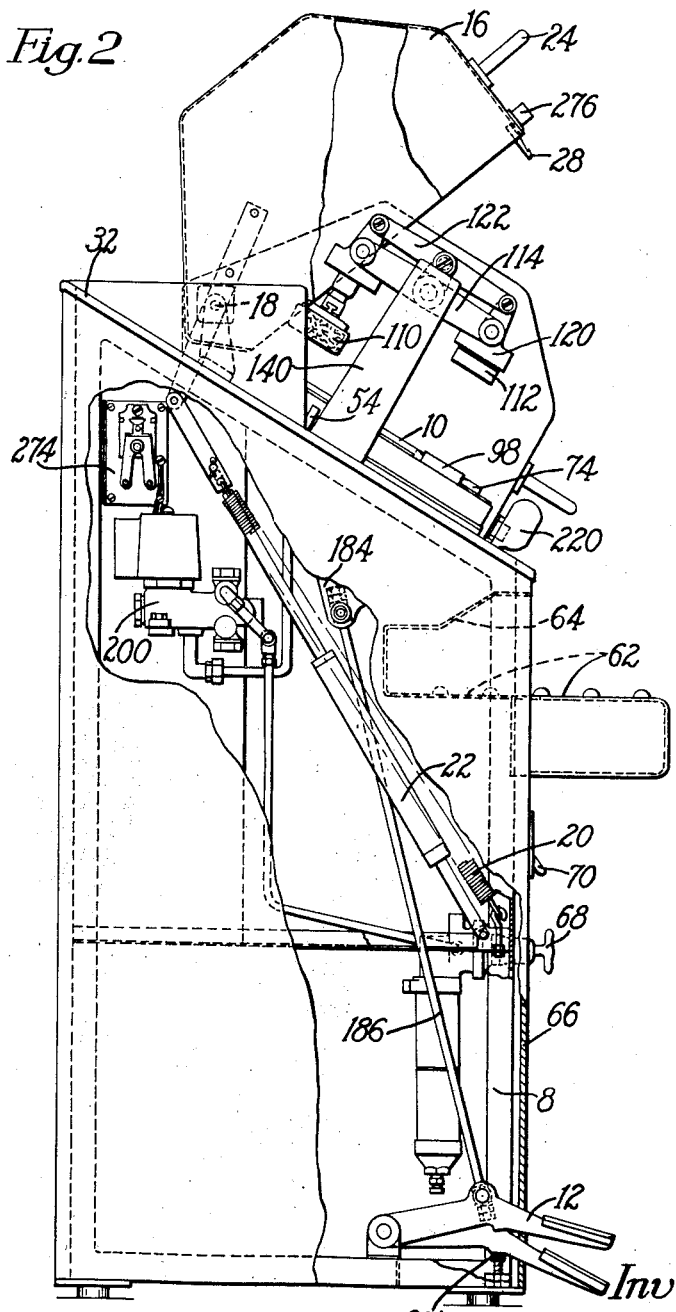
Fig. 2 is a side elevation thereof.

This valve 200, mounted upon the frame 8 as shown in Fig. 2, is of a commercial construction and its exact structure is not shown but its mode of operation is indicated in the diagram of Fig. 10. From the diagram, the valve will be seen to comprise two valve members 202 and 204 the first of which is normally held closed by an associated spring and which controls the flow of compressed air from a source 206 to the pipe leading to the recess 184 beneath the diaphragm 100. The other valve 204 which is closed when the first valve 202 is opened controls a passage leading to an exhaust 208 and the arrangement is such that this exhaust valve is closed when the inlet valve 202 is opened. The valve is arranged to be operated by a solenoid 210 connected between the opposite sides of power lines 212. Interposed in this connection is the normally open switch 190 and another switch 214 which is normally closed.

After the shoe has been treated, the operator will release the air pressure by de-energizing the solenoid 210 by opening the switch 214 by means of a hand lever 220. This hand lever is mounted upon a rod 222 extending rearwardly of the machine in hangers 224 and 226 (Fig. 9) forming part of the casting 69 just under the top plate 32. On this rod between the hangers is an arm 228 having in it a screw stud adapted to wipe over a spring plate 230 which overlies the depressible switch button 214. The latter is carried on a plate 232 which has two side members 234 and a hanger 236 which is fastened to an angle iron 238 forming part of the frame. Only a slight turning movement of the handle is required to operate this switch and upon a more extended movement the handle will be effective, as later described, to disengage the pawls 150 so as to allow upward movement of the shoe clamps. It is important however, that the pawls shall not be knocked off until the air has been mostly exhausted from the space beneath the diaphragm 100.

Accordingly, a safety device is provided which is associated with the connections between the hand lever 220 and the pawl disengaging arrangement. The latter arrangement comprises swinging members 240 (Fig. 5) and 242 having knock-off pins 244 and 246 and the pins are arranged in recesses in the lower ends of the pawls 150, these recesses being larger than the pins to permit a slight movement of the handle 220 sufficient to open the switch 214 which controls the air exhaust valve 204. The hangers which support the knock-off pins are connected by links 248 and 250 to the ends of an upright lever 252 which is secured by a setscrew to the far end of the shaft 222 on which the handle 220 is mounted.

In order to prevent the possibility of a movement of this hand lever 220 to release the clamp before the air has been exhausted from the pad, a detent 254 is provided which has a shoulder 256 adapted to cooperate with a roll 258 upon the link 248. After a slight movement of the handle 250 sufficient to open the air valve 200 by opening the switch 214, this roll comes against the shoulder 256 of the detent 254. The latter, pivotally supported at 260 upon a hanger, has an upstanding arm 255 which is joined by a link 262 to the piston 264 of an air cylinder 266 connected by a pipe 270 to the space beneath the diaphragm 100. As long as there is air pressure in the cylinder, the detent 254 is held in the position shown in Fig. 5 but when the pressure has been relieved, as by the opening of the exhaust valve 204, then the detent is lowered by a spring 268 within the cylinder.

The operation of this air valve is effected by the solenoid 210 (Fig. 10) which, assuming that the switch 214 is closed, is energized whenever the switch 190 on the two-part treadle lever 169 is permitted to close by the separation of these two parts because of pressure exerted on the treadle. At the same time a holding relay 274 is energized which supplies power to hold the air valve 202 open to inflate the pad even after the treadle has been released by the operator and until, at the completion of the operation, the hand lever 220 is moved slightly in a clockwise direction to open the switch 214. In order to make sure that the switch 214 is normally closed at the beginning of a cycle a knob 276 (Figs. 1 and 2) upon the front of the shield 16 is so positioned that it physically contacts the hand lever 220 and forces it to its left-hand position whenever the shield is closed, as shown at the right of Fig. 1.

As soon as a shoe has been clamped in position and the pad beneath it has been inflated to insure complete contact of the sole with all portions of the bottom of the shoe, which in this case would be the platform sole 82 just above the outsole 80, then the operator is ready to energize the electrodes so as to set up an electric field which will activate the cement and complete the attachment of the sole to the shoe. The operator, in starting to use the machine, will have closed the main switch 70 and after a brief interval, a time delay relay 276 (Fig. 10) will have closed its contacts. This delay is intended to give the cathodes in the various tubes of the power supply time enough to become heated before the power supply is required to furnish power to the electrodes.

Upon the closing of the main switch 70, a yellow light Y will glow and then as soon as the time delay relay 276 has closed, turning on a green light G, a principal control relay 280 will be energized putting out the yellow light, the apparatus then being in a "ready" condition.

Figure 9:
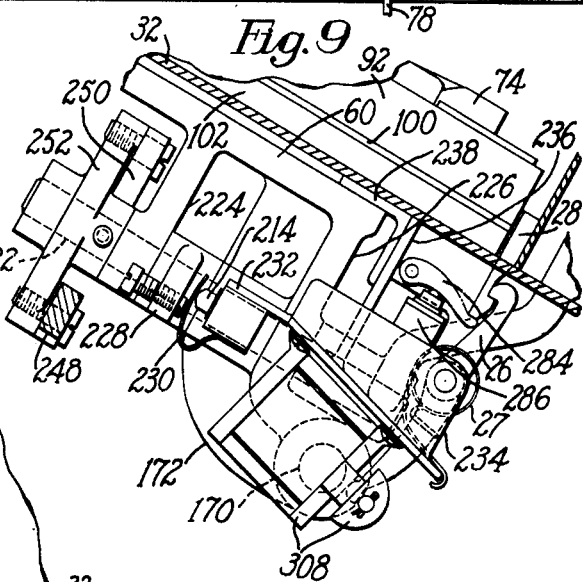
Fig. 9 is a detail in vertical section of a shield-latching mechanism.

The operator will then close the shield to cover the work which has been adjusted and clamped on one of the electrode pads and in so doing the pin 28 upon the shield which is being closed will engage a lever 284 (Fig. 9) which will close a switch 286 (Figs. 9 and 10). This will close the circuit from the power mains 212 through the upper contacts of the principal control relay 280 to energize a power relay 288 which when lifted will connect the supply mains 212 to a power supply circuit 290 extending to one of the transformers of a full wave bridge-connected rectifier 292 (Fig. 11) which is arranged to supply direct current energy to an oscillator 294 having a tank coil 296. This tank coil will be connected by a lead 37 to an electrode associated with the shoe beneath the closed shield which latter will have closed one of the switches 30 shown in Fig. 8. Associated with the plate circuit of the rectifier 292 is a protective plate overload relay 298 while in the grid circuit of the oscillator there is a protective grid overload relay 300. The contacts of these relays are in series with one another in a circuit 302 (Fig. 10) also containing the contacts of the time delay relay 276 and the contacts of a timer switch 304 adapted to be opened at the end of a predetermined interval by a timer 306 of any known construction, driven by power from the circuit 290 and automatically reset at the end of each cycle.

It will be noted that momentarily after the switch 286 has been closed by the closing of the shield there will be an energization of a solenoid 308 arranged to release the latch 26. However, the circuit for this solenoid 308 extends from the mains 212 through the lower contacts of the power relay 288, the plunger of which will be lifted almost immediately, thus allowing the shield to remain closed for the duration of the heating cycle and until the timer switch 304 breaks the circuit to the green light G and to the principal control relay 280 and this in turn de-energizes the power control relay 288 and the solenoids 308 will be energized to release the latch 26 and allow the shield to be opened. Opening of the shield opens the switch 286 which when open prevents operation of the oscillator by preventing the power relay 288 from being energized to supply high voltage power to the plate circuit of the oscillator. The initial de-energization of relay 280, by de-energizing switch 304 also returns the apparatus to the "ready" condition, but the cover 16 is unlatched to open before relay 288 is energized by the return of energization to the relay 280.

Should either of the grid or plate currents depart from the predetermined range of magnitude in which the contacts of relays 298 and 300 remain closed, for example, should the magnitude of the grid current increase sufficiently to open relay 300, the interruption of the circuit 302 causes a chain of events similar to that produced by opening of the timer switch, so that the cover is opened and switch 286 prevents operation of the oscillator until the cover is again closed.

Assuming then that the switch 70 has been closed and that the yellow light Y is glowing, the operator will place a shoe on the pad at one station and clamp it by depressing the corresponding treadle. When sufficient pressure has thus been applied, the switch 190 on the treadle lever will be closed, energizing the air valve solenoid 210 and inflating the pad. The holding relay 274 will keep solenoid 210 energized even if the treadle is released. Assuming that the other shield 16 is open and that the green light G is glowing, he then only needs to close the shield to cover the work thus closing the switches 30 and 286. This latter energizes the power relay 288 to supply power to the mains 290 and starts the timer 306. He then may leave this station and start to position a shoe in the other station and to clamp it there while high-frequency power is being applied to the first shoe to activate its cement. The completion of the interval required for this operation will be indicated automatically by the timer 306 which will then disconnect the power by opening the principal relay 280, thus de-energizing the power relay 288 and withdrawing the latch 26. He then may close the shield over the second shoe and proceed in the same manner.

The modified circuit illustrated in Fig. 12 is adapted to provide additional protection against oscillator overload conditions, for example arcing between the electrodes, under which conditions the oscillator grid-current falls below normal. Accordingly, an undercurrent relay 310 is shown in Fig. 12 connected into the grid circuit of the oscillator in series with the relay 300. The contacts of the undercurrent relay are in series with the connections between the upper contacts of the principal control relay 280 and the power relay 288. A normally open starting switch 312 is connected across the contacts of relay 310. With this arrangement, after the apparatus has warmed up and the green light G is glowing, the operator after placing a shoe under pressure may, as before, close the shield, covering the work and closing the switches 30 and 286. However, the power relay 288 will not be energized, and hence the heating interval will not start, until the starting switch 312 has been closed. Conveniently, this switch may be arranged to be operated by a slight over-travel movement of the cover 16 beyond its normal closed position as the operator depresses the cover. However, the switch 312 may be arranged to be actuated in any other convenient manner, for example, by one of the operator's hands while the cover is held closed by his other hand. Closure of starting switch 312 now energizes the power relay 288 and supplies power to the mains 290 to energize the oscillator and to start the timer 306. The flow of the grid current in the oscillator will energize the relay 310 to close its contacts so that the starting switch 312 may be released without interrupting the operation of the apparatus and thereafter the apparatus will carry through the heating interval as described above. Should, however, a condition arise wherein the grid current falls below the pre-determined amount necessary to hold the contacts of relay 310 closed, the power relay 288 will be de-energized, the oscillator shut off and the cover unlatched by the energization of solenoid 308.

Having thus described my invention, what I claim as new and desire to secure by Letters Patent of the United States is:

1. In a high-frequency electric treating apparatus, a plurality of work-treating stations each comprising a work support, electrodes positioned to create an electric field through a piece of work on said support, a movable electrical shield adapted, when in operative position, to cover the work and said electrodes, switching means controlling the connection of high-frequency electric energy from an energy supply means to said electrodes, and means connected to said shield for actuating said switching means to supply power to the electrodes to treat the work only when said shield is moved into covering position, and means for limiting the number of stations which may be operated at a given time, thereby to prevent overloading of said energy supply means.

2. In a high-frequency electric treating apparatus, a pad, means for pressing a piece of work against said pad, electrodes arranged to set up a field adjacent to the pad, a movable shield for covering the work and said electrodes, incomplete connections between an oscillator and the electrodes, electric contact means arranged to be closed by the closing of the shield, for completing said connections and for energizing a relay controlling said oscillator to supply power to said electrodes when the shield is closed, a solenoid released spring latch for said shield, and timing means associated with said relay for determining the heating interval following the closing of said shield, said relay being operative when de-energized, to release the latch holding the shield closed.

3. In a high-frequency electric treating apparatus, an oscillator, a plurality of work heating stations individually comprising electrodes, means for positioning a piece of work within the field region of said electrodes, a movable shield for covering such a piece of work and its electrodes, and electric contact means controlled by said shield for connecting the electrodes to the oscillator only when the shield is moved to cover the work, and interlocks between said shields for determining the number of stations which may be operated at a given time.

4. In a high-frequency electric treating apparatus, a plurality of attaching stations individually comprising work supports and electrodes positioned in cooperative relation to said supports, a high-frequency oscillator, connections between said oscillator and the electrodes at the several stations, a switch at each of said stations in series with said connections, a switch at each of said stations closable for rendering the oscillator effective to supply power, means at each station for actuating both of said switches at that station, and means cooperating with the actuating means of all stations for preventing simultaneous closure of the switches of more than one station.

5. In a high-frequency electric treating apparatus, multiple stations, electrodes at each station for producing a field in a piece of work, movable shields at adjacent stations adapted to be closed to cover said electrodes at the respective stations, interlocking means actuated by a shield as it is closed to prevent the closing of another shield, and means actuated by the shield at each station, as it closes, for connecting a supply of high-frequency electric energy to the electrodes at said station.

6. In apparatus for cement sole attaching, a resilient inflatable work supporting pad, a cooperative clamping mechanism for applying initial pressure to a piece of work to clamp it against said pad, means for operating said clamping mechanism, spring means for determining the initial pressure of said clamping mechanism, a solenoid operated valve controlling the inflation and deflation of said pad, means for operating said valve to inflate said pad when said initial pressure exceeds a predetermined value, movable lever means to release the clamping mechanism, a switch for operating said valve to deflate said pad, said switch being actuated by the initial movement of said lever means, and means responsive to the fluid pressure in the pad for limiting further movement of said lever means until said working pressure has been reduced to a predetermined value, whereupon the movement of the lever means may be continued to release the clamping mechanism.

7. Apparatus as in claim 6 in which said movement-limiting means comprises a cylinder connected to said pad, a detent positioned for engagement with said lever means, a piston in the cylinder connected to said detent, and a spring for releasing said detent when the pressure in the cylinder is released.

8. In apparatus for cement sole attaching, an inflatable work supporting pad and a cooperative clamp for pressing a piece of work against said pad, a treadle for bringing said clamp into pressure transmitting relation with the work against said pad, means operated by the movement of said treadle to inflate said pad, means to deflate said pad, and means operated by further movement of said deflating means for releasing said clamp, said latter two means being interconnected to prevent the clamp from being released before the pad is at least partly deflated.

9. In apparatus for cement sole attaching, an inflatable work supporting pad, a cooperative clamp for pressing a piece of work against said pad, a treadle, a spring connected to said clamp to cause the clamps to draw the work against the pad, a valve to control inflation of the pad, means connected to said treadle to operate said valve when the tension in the spring exceeds a predetermined amount thereby to protect said pad against excessive expansion and to facilitate conforming it to the surface of the work, means for deflating said pad before said clamp is released, and means operated by said deflating means for releasing said clamp.

10. In apparatus for cement sole attaching, an inflatable work supporting pad, a cooperative clamp for pressing a piece of work against said pad, a treadle spring-connected to said clamp to draw the work against the pad, a valve to control inflation of the pad, means connected to said treadle to operate said valve when the tension in the spring exceeds a predetermined amount thereby to protect said pad against excessive expansion and to facilitate conforming it to the surface of the work, lever means for deflating said pad and then releasing said clamp, and pneumatically responsive means controlled by the pressure in the pad for limiting the movement of said lever to release said clamp until the pressure in the pad has been reduced to a predetermined value.

11. In apparatus for cement sole attaching, a work support, a cooperating clamp for pressing a piece of work against said support, pawls for retaining said clamp in work engaging position, a hand lever for releasing said pawls, a movable cover for the work, and means operated by the closing of the cover for resetting said hand lever to a position where it does not interfere with the effectiveness of said pawls.

12. In apparatus for cement sole attaching, an inflatable work supporting pad, means for inflating the pad, means including a hand lever for deflating the pad, a cover for the work movable into covering position, and means on the cover for rendering said hand lever inoperative when the cover is closed.

13. In apparatus for cement sole attaching, an inflatable work supporting pad, means for inflating said pad including a valve, a cover movable into position over the work and the pad, a hand lever controlling said valve to deflate the pad, and means on said cover for moving the hand lever to inoperative position as the cover is closed.

14. In a high-frequency electric treating apparatus, an inflatable, electrode-carrying pad, a clamp for holding a piece of work against said pad, oscillator means for supplying high-frequency energy to the electrodes carried by said pad, means for moving said clamp to grip the work against said pad under an initial pressure, a switch actuated by said means upon the application of said initial pressure, pneumatic means controllable for inflating or deflating said pad and rendered effective by the closing of said switch to inflate said pad and to press it against the work, a movable shield adapted to be positioned over the work and said electrodes, a latch to hold said shield in effective position, a control switch actuated by the positioning of said shield, a power control relay operated by said switch to render said oscillator operative to treat the work, timing means for determining the treating interval, a timer relay, operated at the end of said interval, for disconnecting said power control relay and thereby releasing said latching means, operator controlled means for controlling said pneumatic means for deflating said pad, and means for relieving the pressure of said clamp when the pressure in said pad has been reduced to a predetermined value.

15. In a high-frequency electric treating apparatus, a supporting frame and a pair of operating stations carried thereby, each of said stations comprising an inflatable pad provided with electrodes, a clamp above said pad to grip a piece of work against said pad under pressure, a swinging shield carried at the top of said frame and adapted to be positioned over said pad and the work to prevent electrical radiation therefrom during operation, spring means for holding said shield normally open, means to operate said clamp to press the work against said pad under an initial pressure, means for inflating said pad when said pressure has been attained, a high-frequency oscillator associated with both stations to energize said electrodes at one station upon the closing of the shield at that station, interlocking means for preventing the closing of both shields at the same time, timing means for determining the treating interval at a station and for causing the release of said shield when the work has been treated, and means for successively deflating said pad and then releasing said clamp, to allow the removal of the work from that station.

GEORGE T. HART.

REFERENCES CITED

The following references are of record in the file of this patent:

UNITED STATES PATENTS

| Number | Name | Date |
|---|---|---|
| 2,301,205 | Finn | Nov. 10, 1932 |
| 2,379,059 | Ashley et al. | June 26, 1945 |
| 2,401,277 | Stratton | May 28, 1946 |
| 2,419,307 | Zottu | Apr. 22, 1947 |
| 2,442,451 | Albin | June 1, 1948 |
| 2,467,285 | Young et al. | Apr. 12, 1949 |
| 2,473,188 | Albin | June 14, 1949 |

FOREIGN PATENTS

| Number | Country | Date |
|---|---|---|
| 441,496 | Great Britain | Jan. 20, 1936 |